March 13, 1962  J. W. HERRINGTON  3,025,176
THERMAL INSULATION COMPOSITION AND PREFORMED
FITTINGS MADE THEREFROM
Filed March 9, 1959
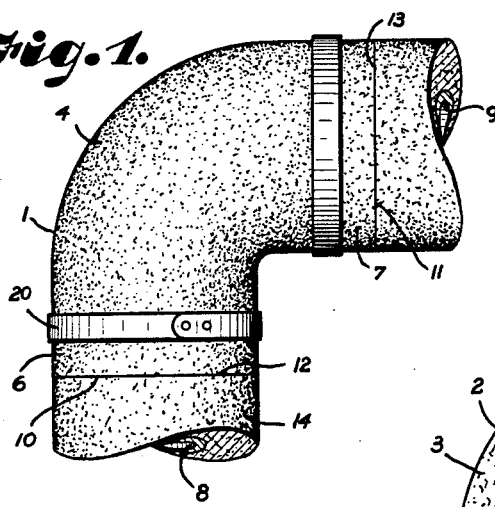
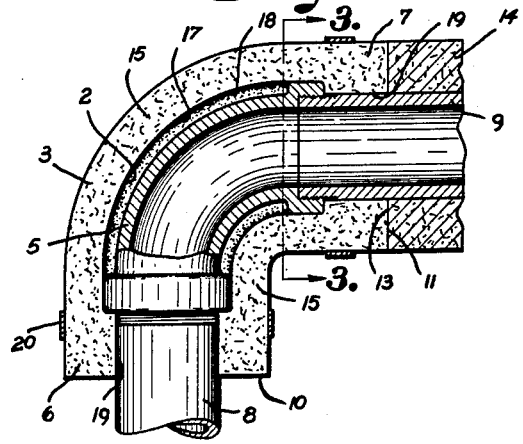
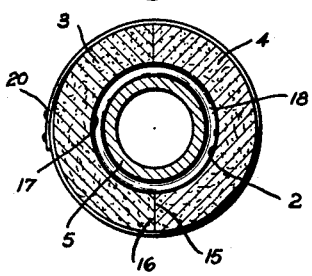
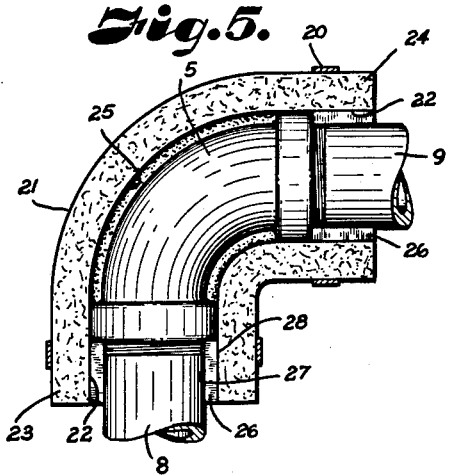
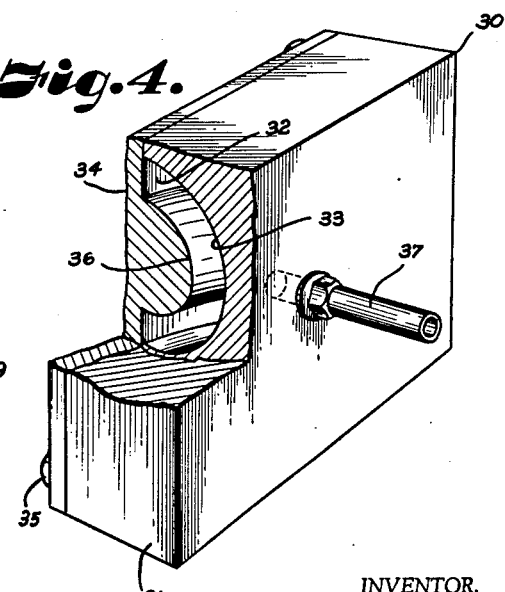
INVENTOR.
Joseph W. Herrington.
BY
Fishburn and Gold
ATTORNEYS.

United States Patent Office 3,025,176
Patented Mar. 13, 1962

3,025,176
THERMAL INSULATION COMPOSITION AND PRE-
FORMED FITTINGS MADE THEREFROM
Joseph W. Herrington, 3904 E. 112th St.,
Hickman Mills, Mo.
Filed Mar. 9, 1959, Ser. No. 798,040
2 Claims. (Cl. 106—98)

This invention relates to thermal insulation material designed to cover fluid conduit structures such as pipe and fittings for carrying either hot or cold fluids as, for instance, steam, hot water and cold water pipes. The invention pertains especially to a premolded insulation jacket for pipe fittings, valves and the like, and the insulation composition used therefor.

The principal objects of the present invention are to provide a thermal insulating material which is mixed with water and then molded and dried to a desired form; to provide such insulation material which dries with little shrinkage and is characterized by fine porosity, smooth surfaces and medium hardness, but not brittle whereby the produce can be stored, handled and transported without damage; to provide a premolded insulating jacket for fittings and the like that can be easily applied to the fittings already in place and that does not require any particular skill in the application; to provide such insulation jackets for pipe fittings that will accommodate a variety of sizes whereby a large number of different size fittings require only a relatively small number of different size insulation jackets; to provide such insulation jackets with shapes at the ends that substantially register with the ends of the jackets on the adjacent pipe; to provide such an insulation jacket in complementary sections assembled to form complete enwrapment of the pipe fitting with support means at the ends on the adjacent pipe; and to provide insulation material and jacket thereof that is economical to manufacture, easy to apply, with a smooth exterior, and that is light in weight yet efficient in operation.

Other objects and advantages of this invention will become apparent from the following description taken in connection with the accompanying drawings, wherein are set forth by way of illustration and example certain embodiments of this invention.

FIG. 1 is a side elevation of a premolded insulation jacket and insulation covering on adjacent pipes.

FIG. 2 is a longitudinal sectional view through the insulating jacket illustrated in FIG. 1 surrounding a fitting in the form of an L.

FIG. 3 is a transverse sectional view through the jacket and fitting on the line 3—3, FIG. 2.

FIG. 4 is a perspective view of a mold for a jacket section with portions broken away to illustrate the interior thereof.

FIG. 5 is a longitudinal sectional view through a modified form of insulation jacket in the form adapted for pipe L's.

Referring more in detail to the drawings:

1 designates an insulation jacket which is premolded to a shape to cover a pipe fitting, valve or the like. In the illustrated structure, the jacket is shaped to cover a pipe L; however, this is merely an example, as the invention contemplates various premolded shapes wherein the cavity 2 in the jacket will accommodate a desired fitting. The jacket 1 preferably consists of longitudinally extending sections 3 and 4, which, together provide a complete enwrapment for the fitting, and, thus, when assembled, form a tubular structure having a cavity of suitable size to receive the respective fitting 5 to which the jacket is to be applied. The jacket has end portions 6 and 7 extending beyond the fitting to enclose adjacent ends of pipes 8 and 9 connected to the fitting, with the end surfaces 10 and 11 of the jacket abutting adjacent faces 12 and 13 at the ends of tubular insulation covering 14 that is applied to and forms an enwrapment on the pipes 8 and 9.

The sections 3 and 4 are substantially arcuate in cross section and identical in size and shape, and, in the embodiment of the invention illustrated, two such sections comprise a complete covering unit for the respective fitting, although it should be understood that the number of sections comprising a unit could be increased, if desired. The complementary sections 3 and 4 have mating surfaces 15 and 16 which are preferably flat and radial to the bore or cavity 5.

In conventional practice, the insulation on the pipe usually comprises a relatively thick layer of insulation material and may be applied in a conventional manner. The jacket 1 is preferably molded whereby the end portions 6 and 7 have the same diameter as the insulation jacket on the pipe whereby the outer surfaces of the end portions of the jacket on the fitting register with the outer surfaces of the covering on the adjacent portions of the pipe.

The cavity 2 in the jacket 1 may be shaped to conform to the outer surface of the fitting to which it is applied. However, it is preferable that the cavity 2 be of suitable size whereby it will receive a variety of sizes of fittings, with the inner surface 17 of the cavity spaced as at 18 from the outer surface of the fitting. The end portions 6 and 7 of the jacket 1 have axial bores 19 extending from the ends of the jacket into the cavity, the bores 19 preferably being the same diameter as the outside diameter of the pipe that is connected to the fitting whereby the ends of the jacket engage the adjacent portions of the pipe and are supported thereon. The application of the covering sections to the pipe is simple and merely requires the placing of the sections on the opposite sides of the pipe fitting and moving their surfaces 15 and 16 into engagement. Then, suitable fasteners 20 are applied to hold the sections together, as, for example, bands are secured around the end portions of the jacket to hold the sections together with the inner surfaces at the bores 19 in the end portions engaged with the adjacent ends of the pipe connected to the fitting whereby the fitting jacket is supported on the pipe.

In the form of the invention illustrated in FIG. 5, the jacket 21 is substantially the same structure as that illustrated and described in FIGS. 1 to 3 inclusive, except that the bores 22 in the end portions 23 and 24 are substantially the diameter of the adjacent portions of the cavity 25 that is necessary to surround the adjacent portions of the fitting. Adapter bushings 26 are arranged in the end portions 23 and 24 with their interior surfaces 27 engaged with adjacent portions of the pipe connected to the fitting and their outer surfaces 28 engaged with the inner surface of the bore 22 whereby the bushings provide a support for the end portions of the insulation jacket. The bushings 26 are preferably made in two sections which together provide a complete enwrapment for the pipe to facilitate application to a pipe and fitting that is already in place. Different thickness bushings may be used to adapt the same jacket to various fittings wherein the pipe sizes vary.

The insulation material used in the preformed fitting jacket preferably consists of magnesium carbonate and asbestos fibers, hydrated lime, Portland cement, preferably waterproof Portland cement, and molding plaster such as plaster of Paris, all thoroughly mixed dry and then packaged for storing. When it is desired to make or mold an insulation jacket, a desired quantity of the dry ingredients is then mixed with sufficient water to form a paste or thick slurry which is then forced into a closed mold 30.

The mold consists of a block 31 having a cavity 32 therein defined by a surface 33 which conforms to the outer surface of one-half of the jacket or, in other words, one of the sections thereof. The mold is closed by a cover member or plate 34 secured to the block 31 with suitable fastening devices 35. The plate 34 has a projection 36 extending into the cavity 32 corresponding to the respective shape of the cavity 2 in the jacket section. The slurry of the insulation mixture is then forced through a duct 37 under pressure into the cavity defined by the surface 33 and the projection 36 and plate 34 until the insulating mixture fills the cavity. It is preferable that the slurry be forced into the mold cavity with a pressure of at least 25 pounds per square inch. Then the mold with the insulating material therein is suitably heated as, for example, between 300 to 500° F. to dry the product in the cavity. After the product is dried, the mold is opened and the product removed therefrom. During the drying, there is very little shrinkage, even though the water used in making the paste or slurry may be up to 50 percent of the total weight of the mixture.

It has been found that a suitable composition of the ingredients be 10 to 20 parts hydrated lime, 5 to 10 parts waterproof Portland cement, 5 to 10 parts molding plaster such as plaster of Paris, and 10 to 20 parts of a mixture of magnesium carbonate and asbestos wherein the magnesium carbonate is 85 percent of said mixture. All of the above parts are by weight. Also, diatomaceous earth may be added or substituted for the asbestos whereby the composition may be 10 to 20 parts hydrated lime, 5 to 10 parts waterproof Portland cement, 5 to 10 parts molding plaster such as plaster of Paris, 10 to 20 parts magnesium carbonate, and 3 to 10 parts diatomaceous earth, all parts being by weight. An example of a preferred composition is:

10 pounds of lime hydrated
5 pounds Portland cement, preferably waterproof Portland cement
5 pounds molding plaster, such as plaster of Paris
10 pounds magnesium carbonate
3 pounds asbestos While the mixtures, as specified herein, are particularly adapted for premolding of the insulation jackets, they may also be used for hand molding some insulation jackets in place on specialized fittings.

Another example of a suitable composition is:

10 pounds of lime hydrated
5 pounds waterproof Portland cement
5 pounds molding plaster, such as plaster of Paris
10 pounds magnesium carbonate
10 pounds diatomaceous earth It is to be understood that the diatomaceous earth in this mixture may be reduced and asbestos included for a more fibrous material.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:

1. An insulation composition for covering pipe fittings consisting of substantially 20 parts hydrated lime, 10 parts waterproof Portland cement, 10 parts molding plaster, 20 parts magnesium carbonate, and 3 parts asbestos, all of said parts being by weight.

2. A premolded insulation jacket for covering pipe fittings comprising, complementary sections which together form a hollow structure to surround a pipe fitting to be covered, said sections each being molded of an admixture of water with substantially 20 parts hydrated lime, 10 parts waterproof Portland cement, 10 parts molding plaster, 20 parts magnesium carbonate, and 3 to 10 parts diatomaceous earth, all of said parts being by weight, said sections when dried being of form retaining low shrinkage light weight porous heat insulating material.

References Cited in the file of this patent

UNITED STATES PATENTS

| | | |
|---|---|---|
| 438,507 | Tracey | Oct. 14, 1890 |
| 589,903 | Lysle | Sept. 14, 1897 |
| 829,483 | McConnell | Aug. 28, 1906 |
| 1,157,234 | Lester | Oct. 19, 1915 |
| 1,678,346 | Mattison | July 24, 1928 |
| 2,546,586 | Cross | Mar. 27, 1951 |
| 2,565,340 | Anderson | Aug. 21, 1951 |